ELECTROLYTIC ELECTROPHOTOGRAPHY

Filed March 30, 1956

INVENTORS
EDGAR G. JOHNSON
BYRON W. NEHER
BY
Carpenter, Abbott, Coulter & Kinney
ATTORNEYS United States Patent Office 3,010,883

Patented Nov. 28, 1961

3,010,883

ELECTROLYTIC ELECTROPHOTOGRAPHY

Edgar G. Johnson, St. Paul, Minn., and Byron W. Neher, Hudson, Wis., assignors to Minnesota Mining and Manufacturing Company, St. Paul, Minn., a corporation of Delaware Filed Mar. 30, 1956, Ser. No. 575,070
13 Claims. (Cl. 204—18)

Figure 1:
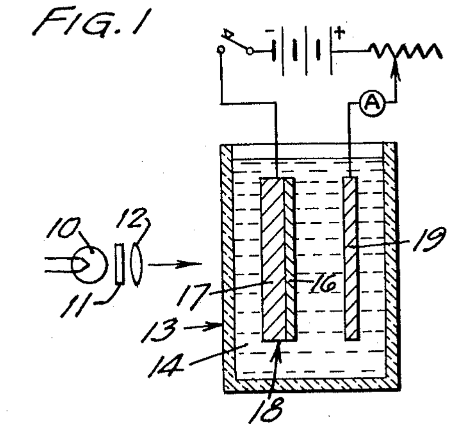

This invention relates to the formation of permanent visible reproductions of light-images on light-sensitive surfaces by methods involving electrolysis at the exposed light-sensitive surface. The process is direct and extremely rapid. It is useful in the reproduction of all types of light-images, but is particularly applicable to the printing of enlargements from microfilm. Electrolysis may be carried out either simultaneously with, or subsequent to, exposure of the light-sensitve surface to the desired light-image.

Photosensitve sheet materials having surface layers which become electrically conductive when irradiated with light of the proper wave-length are well known. Selenium is a typical surface layer material. Cuprous oxide has also been used. These materials are highly colored and hence do not lend themselves to the direct production of copies. However, since the conductivity of the surface varies with incident light, such sheets have been found useful in the transfer copying or reproduction of light-images. For example, powdered colored resins are electrostatically adhered to the exposed and differentially charged surface in a pattern corresponding to the light-pattern initially applied, and are then transferred to a paper or other surface and fused in place to provide a permanent reproduction. The differential conductivity pattern produced by illumination with the light-image, and which is responsible for the differential charge pattern in the above process, may alternatively be used in forming reproductions in absorbent paper containing suitable electrolytes. These various processes permit reuse of the photosensitive sheet material; but such reuse is limited because of the fragile or unstable nature of the surface involved, and is likely to result in the production of "ghost images." The process in general produces reverse reproductions of light-images.

The present invention, on the other hand, involves the formation of a permanent visible image directly on the photosensitive surface of a stable and rugged, normally white or faintly tinted, sensitive sheet material. The image may be either positive or negative, i.e., either the same as, or the reverse of, the applied light-image in location of light and dark areas, and may be either direct or reverse. The image is formed rapidly and with fine detail and effective contrast, and requires no subsequent heating, developing, fixing or other analogous operations. Ghost image formation is completely avoided.

These and other advantages are obtained, in accordance with the principles of this invention, by activating with a light-image a receptor sheet having a strongly photoconductive water-resistant zinc oxide layer on an electrically conductive backing, and then electrolyzing an electrolytic developer solution at the light-exposed and electrically conductive surface areas to form a visible image on said sheet, all as will now be described in terms of the following illustrative but non-limitative specific examples.

*Example 1*

A suitable light-sensitive sheet material was first prepared. A flexible film of transparent cellulose acetate having a thickness of about 10 mils (0.010 inch) was first metallized on one surface, by vapor deposition in a vacuum, with an extremely thin coating of aluminum.

The coating was found to have a surface resistivity of about 200 ohms per square, and transmitted about 55% of incident light in the visible range. Over this metal layer was then applied a suspension of 48 parts by weight of Merck & Co.'s Reagent Grade zinc oxide microcrystals in a solution, in 48 parts toluene, of 4 parts of "Pliolite" resin, a resinous copolymer of butadiene and styrene, serving as a binder, the mixture having been ground in a ball mill until smooth. After drying, the firmly bonded smooth white coating was found to be between 0.3 and 0.6 mil in thickness. The sheet material was highly water-resistant.

Sheet material prepared as just described was suspended in a transparent glass cell containing a solution of 28 grams of copper sulfate in 200 ml. of water. A flat electrode of slightly larger area, in this case a copper plate, was suspended in the solution facing and somewhat removed from the coated surface of the sheet material. A light-image was focused on the uncoated surface of the sheet through the glass wall of the cell, the source of the light being a 100-watt bulb and providing an intensity of about 70 foot-lamberts. Exposure was maintained for about 5 seconds. A source of potential was then connected across the copper plate and the conductive aluminum layer of the sensitive sheet, the latter being connected to the negative pole, and a current of about 15 milliamperes was passed through the system for about 3 seconds. The sheet was withdrawn and rinsed, and was found to have a negative reproduction of the light-image on the sensitive coating. Non-illuminated areas of the sensitive coating remained white, while the exposed areas were darkened by deposition of metallic copper thereon.

Equally effective copy was obtained by exposing the coated sheet to the light-image under dry conditions, and then promptly immersing the sheet in the electrolytic cell and electrolytically developing the image in the manner described.

Silver nitrate solution was substituted for the copper sulfate to provide equally effective image development. Nickelous chloride is also effective, and is improved by the addition of sodium thiosulfate. A particularly effective developing solution contains 10% nickelous chloride and 5% sodium thiosulfate.

The ratio of pigment to binder in the light-sensitive coating was effectively varied over wide ranges. At 12 parts of zinc oxide to one of resin, as in the specific formula just given, the white areas of the print are sometimes found to contain dark spots, indicating non-uniform or insufficient resistivity. Excellent prints are obtained at lower ratios, for example at 8:1 and at 4:1. Somewhat less effective prints are obtained at 3:1 ratios of zinc oxide and "Pliolite" resin, and at 2:1 the light-sensitivity is inadequate and the results are decidedly inferior. These ratios may be specifically different with other specific oxides and resins but will serve to illustrate a generally desirable range.

Electrically conductive glass plates have been substituted for the partially transparent metallized cellulose acetate film as a carrier or base for the light-sensitive coating. A glass having a surface layer high in stannic oxide having a surface resistivity of about 600 ohms per square and a light transmission of at least about 90%, has proven useful, although somewhat lower resistivity is preferred.

The sensitive surface of such transparent photosensitive coated plates is effectively exposed to the light-image through the transparent plate and simultaneously electrolytically developed, as described in the foregoing example. These plates may alternatively be first exposed to the light-image and then, without further irradiation, transferred to the developing station and separately developed, the "light-memory" of the zinc oxide coating being sufficient to maintain the necessary conductivity at the irradiated areas. The latter procedure is equally effective on fully opaque plates such as metal plates coated with the sensitive zinc oxide coating.

Opaque plates have been simultaneously exposed and developed by substituting a copper wire frame for the copper plate of Example 1 and then exposing the sensitive surface of a coated metal plate to a light-image through the frame while carrying out the electrolysis as before. Where the plate area is too large for uniform electrolysis in this manner, a screen is provided in place of the frame, and the screen is moved steadily during electrolysis so as to avoid producing a visible shadow pattern on the sensitive sheet.

Direct current is preferred, with the light-exposed sensitive sheet material normally being connected to the negative pole of the source, i.e., forming the cathode of the electrolytic developer cell. Due to the nature of the sensitive zinc oxide coating, however, it is found to be feasible to apply alternating current and still obtain usefully exact and dense reproductions. The coating appears to have a rectifying effect on such current.

*Example 2*

In this example the sensitized surface is first exposed to a light-image and a visible reproduction is then developed by applying a thin layer of a suitable electrolytic developing agent directly against the exposed surface and applying an appropriate voltage across the interface.

In one modification the electrolyte, e.g., a copper sulfate solution as in Example 1, is applied to the exposed sheet by brushing with an ordinary paintbrush which is connected to the source of potential. A visible image is produced within the short time required to draw the electrolyte-moistened brush slowly over the surface of the sheet.

A thin uniform layer of copper sulfate solution applied to a copper bar or drum which is then drawn or rolled across the exposed surface likewise permits adequate electrolysis to produce a visible image. Replacing the copper sulfate with tartaric acid produces the same result, the copper surface of the bar being dissolved and plated out on the sensitized surface.

Another modification employs a developer-sheet consisting of a conductive sheet of aluminum or copper foil coated with a moist layer of one part of gelatin and three parts of glycerine and containing a small amount of copper sulfate or silver nitrate. It is rolled out into intimate contact with the entire surface of the exposed light-sensitive sheet, and a potential then impressed across the foil and the conductive sheet. Electrolysis takes place at the light-exposed areas, resulting in formation of a visible image on the light-sensitive sheet.

The moist gelatin may also be replaced by a sponge, porous paper, or other absorptive material capable of retaining the electrolyte in quantity sufficient to provide the required developing action. Contact between sensitized surface and developing surface may be over the entire area simultaneously, or over a progressively advancing smaller area as obtained with a gelatin-coated roll.

*Example 3*

The present example employs a normally solid developer material rather than the normally liquid or gelatinous electrolytic developer of the foregoing examples.

Polyethylene glycol melting at about 100° C. ("Carbowax 6000") is combined with small amounts of ethylene glycol and nickel chloride and coated in molten form in a thin layer over the oxide-coated surface of the sensitive sheet of Example 1, hardening to a waxy transparent solid. The sheet is exposed to a light-image and is then developed by slowly drawing a heated metal rod over the coated surface, the rod and sheet being connected to opposite poles of a source of potential. The coating melts and permits electrolysis to proceed, thereby forming a negative reproduction of the light-image. The image is fully visible through the cooled and hardened thin waxy surface layer.

Similar results are obtained with coatings of suitably electrolyzable materials in other heat-liquifiable normally solid solvent media such as polyacrylic acid, carboxymethylcellulose plasticized with glycerine, and gelatin plasticized with glycerine. Solvents which liquify at moderate temperatures produce most effective development, since heating is found to reduce the "light-memory" of the zinc oxide coating; but effective prints have been obtained with binders melting as high as 100° C. or somewhat higher.

*Example 4*

In the above examples, development has been achieved by the electroplating of a metal from a salt solution onto the exposed light-sensitive surface. Other reactions are also useful.

A. The exposed surface is made the cathode in a system in which the electrolyte contains diazonium salts plus coupler materials in acid medium. Colored images are formed on the zinc oxide coating.

A specific electrolyte consists of a one-tenth molar aqueous solution of a mixture of equimolar proportions of tartaric acid, phloroglucinol, and the zinc chloride salt of p-diazo-N-ethyl-N-benzylaniline. The solution is applied, by brushing, to the coated surface of a sensitive sheet made as described in Example 1 which has previously been exposed to a light-image. The sheet is connected to the negative, and the brush to the positive side of a suitable source of potential during application of the solution. A blue-black coloration is produced at the light-struck areas. There is obtained a negative reproduction of the original light-image.

B. The zinc oxide surface is first coated with a thin layer of a mixture of diazotizable amines and coupler materials, and an electrolyte is used which contains sodium nitrite. The sensitized sheet forms the anode. A specific coating consists of a one-tenth molar aqueous solution of a mixture of equimolar proportions of o-dianisidine and beta-naphthol. Electrolysis of the sodium nitrite at the exposed coated surface produces a dark blue color at the light-struck areas. The sheet has a light blue background color.

C. Colloidal charged particles may be deposited from liquid suspension under the influence of the electric potential to form a visible reproduction of a light-image. Thus, a 1% suspension of Prussian blue in water produces a blue deposit on light-struck areas of the zinc oxide coated sheet when the latter serves as the anode. Simultaneous exposure and development results in rapid printing of high contrast reproductions, and is preferred where the light-image is not required to penetrate any substantial depth of suspension. Intense exposure in the absence of the colloidal suspension makes possible subsequent development of faint but visible images in the presence of the suspension.

D. Zinc oxide coatings which are initially strongly colored, e.g., by the presence of suitable oxidizable or reducible dyes, are visibly altered at light-exposed areas by electrolysis in aqueous bleaching solution. This is an example of the formation of a positive image in which light-struck areas become light and unexposed areas remain dark. One such system employs a surface coating of methylene blue on the zinc oxide coating, the dye being rendered colorless at the light-struck areas of the sheet by electrolysis in water containing a small amount of citric acid or equivalent electrolyte.

The colored sensitive sheet is prepared by dipping the oxide-coated sheet of Example 1 into an aqueous solution of methylene blue dye. The dye is adsorbed on the surface of the zinc oxide particles. The dried sheet is normally blue in color, converting to white on electrolysis.

While the dye has a tendency to fade on long aging or on exposure to sunlight, under normal conditions the image produced remains legible for at least six months or longer.

It has also been observed that a positive print made as just described, i.e. by reduction to a colorless condition of light-struck areas of a methylene blue surface coating on a photoconductive zinc oxide paper, may be converted to a negative print by deliberate re-oxidation of the leuco dye, for example by exposure to gaseous oxygen. The re-oxidized dye areas are found to be of a distinctly darker blue than the original coated sheet. Presumably the distribution or particle size of the adsorbed dye is altered during the chemical conversion. The final copy is found to be completely stable except for the tendency to fade slowly on exposure to sunlight.

E. Positive images are also formed with sheets carrying dyes which are more difficultly reducible than is methylene blue. "Celliton Blue BGF Extra," a diazonium dye available from General Aniline and Film Corp., is one example. In such cases, zinc chloride, preferably together with sodium bisulfite, is added to provide a suitable mechanism for controlled reduction of the dye and the development of a visible image. The mechanism appears to involve the inital liberation of zinc metal, which, particularly in the presence of the sodium bisulfite, reduces the dye to the colorless state. Thus, analogous results are obtained by first developing a visible image on a light-exposed photoconductive zinc oxide copy-sheet by electrolysis in a zinc chloride electrolyte in accordance with the method described under Example 1, and then treating the surface with a solution of the diazonium dye which is reduced and decolorized at the zinc-plated areas but retained in colored form at unplated areas of the zinc oxide coating. The solution preferably contains bisulfite in addition to the dye.

Images formed as just described will be seen to be positive images. They are much more stable against fading than are the sheets carrying triphenylmethane dyes, since the diazonium dye does not re-oxidize under atmospheric conditions once it has been reduced to the colorless form.

In all cases, the dye material must be reducible, under the conditions provided, to a visibly different state. It should also be substantive toward the zinc oxide coating so that it remains strongly affixed thereto.

A further variation involves the combination of visibly reducible dye and conductive zinc salt with the transparent fusible solid surface developer coating of Example 3. A solution of methylene blue in a mixture of zinc oxide, "Phiolite" resin binder and toluene-acetone solvent mixture was coated on conductive metallized paper, dried, and over-coaed or surface sized with a thin layer of gelatin and zinc chloride applied from aqueous solution. The sheet was exposed to al gight image and developed by brief contact with a heated metal rod, the rod and backing being connected to the positive and negative sides respectively of a controlled source of electricity. The blue dye was reduced to the colorless leuco form at the light-struck areas. Some of the fused surface layer was removed by the heated rod; the remainder hardened on cooling and protected the surface of the sheet. On continued exposure to the air, the leuco dye was re-oxidized, the thus affected areas then having a visibly darker blue shade than the surrounding areas of the sheet.

*Example 5*

In this example, water alone is applied to the sensitized and exposed sheet for electrolytic development of the visible image. The water may be applied in bulk, or preferably in physically bound form, and the required potential applied across the interface. Development is accomplished by release of soluble components from the sensitive surface itself. Thus, a nickel acetate has been incorporated in the zinc oxide suspension, e.g., by grinding with the oxide in the binder solution, or alternatively has been applied as a thin surface layer over the dried zinc oxide coating. For example, finely powdered nickel acetate is dusted over the still sticky surface of the zinc oxide coating just before drying is completed; or nickel acetate in aqueous solution, preferably together with small proportions of hydrophilic or water-soluble binder such as methyl cellulose or gelatin, is coated as a very thin film over the oxide coating and dried in place. The sheet is exposed to the light-image and is then contacted with a moistened current-carrying roll which is drawn slowly across the treated surface while an electric current is passed between sheet and roll. A visible reproduction of the light-image is produced on the treated surface. The sensitivity of the process is indicated by the observation that useful images have been developed by this procedure as well as by those described in connection with Examples 1 and 2, using as the electrolyte a mixture of only 10% water in alcohol.

The electrolytic development of the visible image by any of the foregoing procedures may obviously be carried out under widely differing conditions as regards time, voltage, and other variables. For practical purposes, however, it is desirable that development be completed within a minimum of time, for example within not more than about 10 seconds. It is also desirable to restrict the operating voltages to those which can be easily provided and controlled without elaborate and expensive equipment and without danger or inconvenience to the operator. Voltages up to not more than about 50 volts fulfill these requirements. The photoconductive layer of the copying-paper must be sufficiently thick to provide adequate opacity against the conductive backing; as noted elsewhere, about 0.3–0.6 mil of the mixture used in Example 1 is highly effective, although up to 2 mils has been found useful. It is found by inspection and analysis that a coating of at least about $25\times10^{-6}$ gram/sq. cm. of nickel or analogous amounts of other materials, is required to produce a suitably visible image. The intensity of the light image is also a factor which must be considered. Within these practical limitations, it may be shown that the conductivity of the light-struck area of the photoconductive layer just prior to electrolytic development must be of the order of $10^{-4}$ to $10^{-7}$ mho per cm. At the same time, in order to obtain good contrast, the conductivity of areas not activated by light must be not greater than of the order of $1/10$ to $1/100$ that of the light-struck areas. French process zinc oxides in general, and specifically the Merck A R grade of zinc oxide employed in the examples, are strongly photoconductive and, when combined with suitable binders and coated as there indicated, have been found to meet these requirements. Other equivalent strongly photoconductive materials are also contemplated. On the other hand, many well-known photoconductor materials are much too low in photoconductivity, or have too small a ratio of photoconductivity to dark-conductivity, or are otherwise inadequate. For example, a coating made with a photoconductive mixture of zinc and cadmium sulfides by the procedures of Example 1 exhibited a photoconductivity of only about $10^{-10}$ mho per cm. and did not yield useful copy under the conditions here listed.

Figure 2:
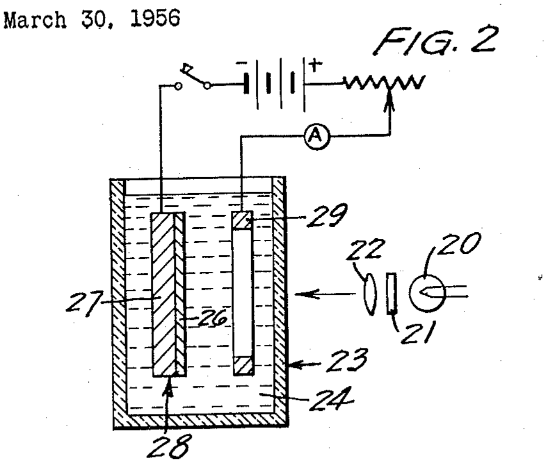

In the accompanying drawing:

FIGURES 1 and 2 are schematic representations of the apparatus and procedures described in connection with Example 1; and FIGURES 3–7 are schematic representations of alternative apparatus and procedure.

In FIGURE 1, light from a lamp 10 passes through a negative transparency 11 and a lens system 12 to produce a light-image which is transmitted through the transparent tank 13 containing the electrolyzable solution 14 and is focused on the light-sensitive layer 16 coated on the transparent conductive backing member 17, the two forming the sensitive sheet material 18. Sheet 18 is electrically connected to an electrode 19 through a controlled source of potential, which as indicated symbolically comprises a switch, battery, variable resistor, and milliammeter. With the light-image focused on the sheet 18, closing the switch causes a selective electrolysis to proceed at the illuminated areas of the coating 16, resulting in the formation of a visible reproduction of the light-image on the sheet 18. Where the solution is copper sulfate and the sheet 18 comprises a zinc oxide coating on a metallized transparent film, the lighted areas are found to be darkened by a plating of copper metal, as described in connection with Example 1.

In FIGURE 2 an opaque sheet 28 is used as the sensitive receptor. It consists of a zinc oxide sensitive coating 26 on an opaque metal plate 27. The light image from the lamp 20, transparency 21 and lens 22 is focused on the oxide coating 26, passing through the transparent wall of the container 23, the solution 24, and the frame-shaped electrode 29.

Figure 3:
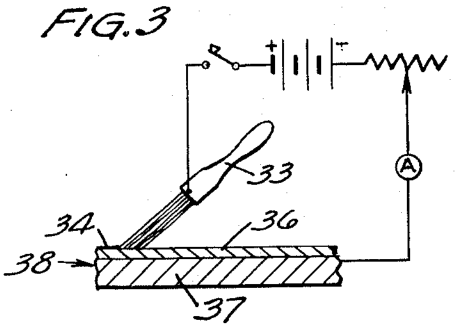

In FIGURE 3, the zinc oxide coating 36, previously exposed to the light image and supported on a suitable conductive backing 37, is coated with a thin layer of electrolyte 34 by means of a paint-brush 33. Electrical connections to brush and conductive backing, as indicated, provide for electrolytic development of a visible image.

Figure 4:
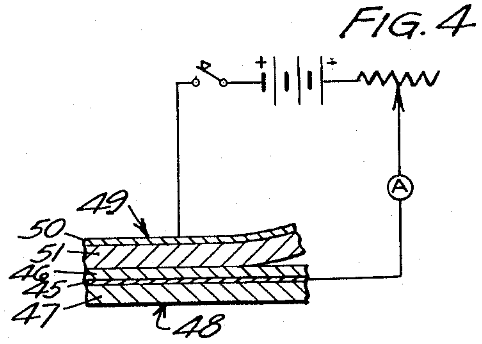

FIGURE 4 illustrates a modification in which a sheet 48, comprising a carrier web 47, conductive metallic layer 45, and strongly photoconductive zinc oxide layer 46, and having been previously exposed to a light-image, is contacted with a developer sheet 49 having a conductive backing 50 and an absorptive layer 51 containing a concentrated solution of electrolyzable developer. Closing of the switch results in electrolysis and visible change at the light-exposed areas of the sensitive layer 46, whereas the unexposed areas remain unchanged.

Figure 5:
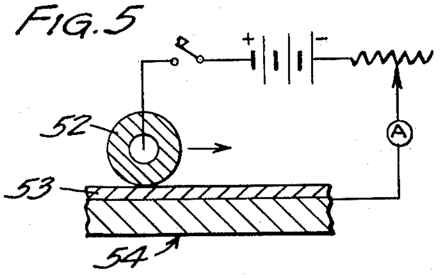

The developer sheet 49 of FIGURE 4 is made into roll form to provide the developer roll 52 of FIGURE 5. On closing the switch and slowly passing roll 52 over the exposed sensitized photoconductive surface 53 of the conductive copy-sheet 54, electrolysis and visible change is produced at the light-exposed areas.

Figure 6:
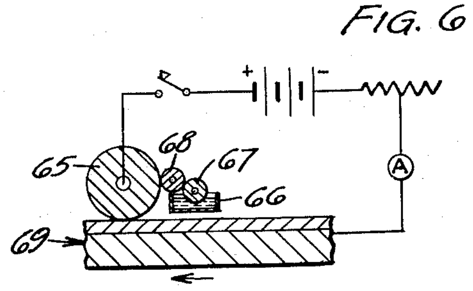

In the device indicated in FIGURE 6 a conductive roll 65 having a non-absorptive or only moderately absorptive surface is continually moistened with suitable liquid from trough 66, applied in predetermined quantity through metering rolls 67 and 68. With the switch closed, the exposed light-sensitive conductive sheet 69 is slowly advanced past the roll 65, as indicated by the arrow, thereby developing a corresponding visible reproduction on the sensitive surface.

Figure 7:
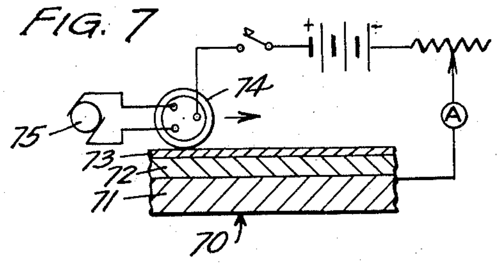

The device of FIGURE 7 employs the process and sheet material of Example 3. The sensitive sheet 70 comprises a conductive backing 71, a strongly photoconductive zinc oxide layer 72, and a fusible solid surface layer 73 containing an electrolyzable developer. The sheet is connected to a source of controlled potential, the other terminal being connected to a metal bar or roll 74 which is internally electrically heated from a source 75. With the roll 74 at the proper temperature, the switch is closed and the roll slowly advanced across the sheet 70, previously exposed to the desired light-image. A visible reproduction is obtained.

It will be understood from the foregoing that the sensitive sheet may be exposed to a light-image either during or prior to electrolytic development. For many purposes the latter is preferred. It is found that sensitive sheets prepared as described in Example 1 have sufficient light-memory so that they may be developed in darkness provided exposure has occurred within not more than a few seconds, or at best a few minutes, prior to development. The procedures described will be seen to offer means for almost instantaneous development after exposure, as well as for simultaneous exposure and development.

As previously indicated, the sensitive coatings may be applied to any conductive base. Conductive glass, metallized cellulosic webs, and metal foil have specifically been noted; but paper containing conductive salts, paper or film containing acetylene black, regenerated cellulose film plasticized with glycerine or other humectant, and many other analogous materials have likewise been found to be sufficiently conductive to be useful.

The copolymer of styrene and butadiene employed in Example 1 as a binder for the light-sensitive zinc oxide is a water-resistant, flexible, adherent, film-forming polymer of highly satisfactory properties. It is light in color, and does not interfere wtih the light-sensitivity of the pigment. It is readily soluble in low cost solvents, yet the solvent may be removed without difficulty by forced drying. The polymer is relatively inexpensive and readily available. Other binders meeting most or all of these requirements include polystyrene, chlorinated rubber, rubber hydrochloride, polyvinylidene chloride, nitrocellulose, polyvinyl butyral. On the other hand, polymers which are dissolved or softened by water, or which are dark in color, or insoluble in commercial solvents, or reactive with the pigment, are found to be ineffective. As typical examples, polyvinyl alcohol, polyacrylic acid, and sodium carboxymethyl cellulose are not acceptable as binders for the light-sensitive sheet materials of this invention.

As previously noted, the ratio of pigment to binder may vary widely in these light-sensitive coatings. Mixtures of pigments and mixtures of binders may be employed if desired, and various other components may be added to the pigment-binder coatings; electrolytic developers have previously been mentioned in connection with Example 5. Dyestuffs may be added to alter the spectral sensitivity of the coating. While very thin coatings are preferred, the coatings must be sufficiently thick to avoid short circuiting or electrical breakthrough and to provide adequate visual background. Excessive thickness reduces the conductivity of the exposed coating and is wasteful of material. In general, coatings from slightly less than one-half mil up to about 2 mils in thickness include the most useful range.

What is claimed is as follows:

1. A method for producing a visible reproduction of an image pattern which comprises exposing to said image pattern an integral photoconductive sheet comprising a highly electrically-conductive metal layer and a photoconductive coating overlying and bonded directly to said metal layer comprising an N-type photoconductor in particulate form and an organic water-resistant binder, said photoconductive coating bonded to said metal layer having a conductivity of at least $10^{-7}$ mho/cm. on exposure to light, contacting the photoconductive sheet on the exposed surface thereof with an electrolytically-conductive liquid solution containing a developer material, and creating a direct current electrical potential, and thereby causing a current flow, between said metal layer and said electrolytic solution while the exposed surface of said photoconductive sheet is in contact with said electrolytic solution to deposit a material derived from said developer material on said exposed surface which effects a visible color change imagewise on said exposed surface.

2. The method of claim 1 in which said developer material comprises a water-soluble heavy metal salt.

3. The method of claim 1 in which said developer material comprises a water-soluble inorganic heavy metal salt.

4. The method of claim 1 in which said developer material comprises a water-soluble organic heavy metal salt.

5. The method of claim 1 in which said developer material comprises a diazonium salt.

6. The method of claim 1 in which said developer material comprises a reducible dye.

7. The method of claim 1 in which said developer material comprises a diazotizable amine.

8. The method of claim 1 in which a gelatin layer containing the developer material is coated on said photoconductive coating.

9. A method for producing a visible reproduction of an image pattern which comprises exposing to said image pattern an integral photoconductive sheet comprising a highly electrically-conductive metal layer and a photoconductive coating overlying and bonded directly to said metal layer comprising photoconductive zinc oxide in particulate form and an organic water-resistant binder, contacting the photoconductive sheet on the exposed surface thereof with an electrolytically-conductive liquid solution containing a developer material, and creating a direct current electrical potential, and thereby causing a current flow, between said metal layer and said electrolytic solution while the exposed surface of said photoconductive sheet is in contact with said electrolytic solution to deposit a material derived from said developer material on said exposed surface which effects a visible color change imagewise on said exposed surface.

10. A method for producing a visible reproduction of an image pattern which comprises projecting said image pattern on an integral opaque photoconductive sheet comprising a highly electrically-conductive metal layer and a photoconductive coating overlying and bonded directly to said metal layer comprising photoconductive zinc oxide in particulate form and an organic water-resistant binder to form a latent reproduction thereon, subsequently contacting the photoconductive sheet on the exposed surface thereof with an electrolytically-conductive liquid solution containing a developer material, and creating a direct current electrical potential, and thereby causing a current flow, between said metal layer and said electrolytic solution while the exposed surface of said photoconductive sheet is in contact with said electrolytic solution to deposit a material derived from said developer material on said exposed surface which effects a visible color change of said latent image on said exposed surface.

11. A method for producing a visible reproduction of a light image which comprises exposing to said light image an integral photoconductive sheet comprising a highly electrically-conductive metal layer and a photoconductive coating overlying and bonded directly to said metal layer comprising photoconductive zinc oxide in particulate form and an organic water-resistant binder, subsequently contacting the just exposed photoconductive sheet on the exposed surface thereof with a conductive absorbent carrier containing an electrolytically-conductive aqueous solution containing a developer material, and applying a direct current electrical potential, and thereby causing a current flow, between said metal layer and said conductive carrier while the exposed surface of said photoconductive sheet is in contact with said conductive carrier to deposit a material derived from said developer material on said exposed surface which effects a visible color change imagewise on said exposed surface.

12. A method for producing a visible reproduction of a light image which comprises exposing to said light image an integral photoconductive sheet comprising a highly electrically-conductive metal layer and a photoconductive coating overlying and bonded directly to said metal layer comprising photoconductive zinc oxide in particulate form, an organic water-resistant binder, and an electrolyte and a water-soluble developer material in dry form, moistening the exposed surface of said photoconductive sheet with water to solubilize at least a portion of the aforesaid electrolyte and water-soluble developer, and applying a direct current electrical potential, and thereby causing a current flow, between said metal layer and said moistened surface of said photoconductive sheet to deposit a material derived from said developer material on said exposed surface which effects a visible color change imagewise on said exposed surface.

13. The method for producing a visible reproduction of a light image which comprises exposing to said light image an integral photoconductive sheet comprising a highly electrically-conductive metal layer, a photoconductive coating overlying and bonded directly to said metal layer comprising photoconductive zinc oxide in particulate form and an organic water-resistant binder and an outer surface layer overlying and bonded to said photoconductive coating comprising a solid fusible electrolyte containing a developer material, liquefying by heating said outer fusible layer of said just exposed photoconductive sheet forming a liquid solution of the electrolyte, and applying a direct current electrical potential, and thereby causing a current flow, between said metal layer and said liquid electrolytic solution to deposit a material derived from said developer material on said exposed surface which effects a visible color change imagewise on said exposed surface.

References Cited in the file of this patent

UNITED STATES PATENTS

| | | |
|---|---|---|
| 168,465 | Edison | Oct. 5, 1875 |
| 1,902,213 | Brockway | Mar. 21, 1933 |
| 2,083,249 | Thomson | June 8, 1937 |
| 2,297,691 | Carlson | Oct. 6, 1942 |
| 2,319,765 | Talmey | May 18, 1943 |
| 2,433,632 | Solomon | Dec. 30, 1947 |
| 2,541,488 | Vanselow et al. | Feb. 13, 1951 |
| 2,633,796 | Pethick | Apr. 7, 1953 |
| 2,692,178 | Grandadam | Oct. 19, 1954 |
| 2,735,785 | Greig | Feb. 21, 1956 |
| 2,744,859 | Rines | May 8, 1956 |
| 2,758,939 | Sugarman | Aug. 14, 1956 |
| 2,798,959 | Moncrief-Yeates | July 9, 1957 |
| 2,798,960 | Moncrief-Yeates | July 9, 1957 |
| 2,808,328 | Jacob | Oct. 1, 1957 |
| 2,837,471 | Law | June 3, 1958 |

FOREIGN PATENTS

| | | |
|---|---|---|
| 464,112 | Great Britain | Apr. 12, 1937 |

OTHER REFERENCES

Greig: Proceedings of the IRE, October 1948, pp. 1224–1235.

Vorden: Modern Photography, January 1958, pp. 34, 36 and 38.

Tory: Photolithography, Graphic Arts Monthly (1953), pages 184–187.

Wilcke: Phot. Korresp., June 1920, pages 173–175.

Radiocraft for March 1943, page 334.

R.C.A. Review, December 1954, pages 469, 470 and 475.